(12) United States Patent
Al-Damluji et al.

(10) Patent No.: US 12,143,300 B2
(45) Date of Patent: Nov. 12, 2024

(54) PACKET BUFFERING WITH A COMMON TIME-INDEXED DATA STORE ACROSS PACKET STREAMS

(71) Applicant: Microsoft Technology Licensing, LLC, Redmond, WA (US)

(72) Inventors: Salem Amin Al-Damluji, Chorleywood (GB); Anish Kavia, Slough (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/682,758

(22) Filed: Feb. 28, 2022

(65) Prior Publication Data

US 2023/0216794 A1     Jul. 6, 2023

Related U.S. Application Data

(60) Provisional application No. 63/295,014, filed on Dec. 30, 2021.

(51) Int. Cl.
*H04L 45/7453* (2022.01)
*H04L 45/00* (2022.01)
*H04L 45/121* (2022.01)
*H04L 45/42* (2022.01)
*H04N 21/43* (2011.01)

(52) U.S. Cl.
CPC ........ *H04L 45/7453* (2013.01); *H04L 45/121* (2013.01); *H04L 45/42* (2013.01); *H04L 45/566* (2013.01); *H04N 21/43076* (2020.08)

(58) Field of Classification Search
CPC ... H04L 45/7453; H04L 45/121; H04L 45/42; H04L 45/566; H04N 21/4302; H04N 21/43076
See application file for complete search history.

(56) References Cited

U.S. PATENT DOCUMENTS

| 6,360,271 | B1 | 3/2002 | Schuster et al. |
| 7,031,259 | B1 * | 4/2006 | Guttman ............. H04N 21/218 348/E7.071 |
| 7,127,508 | B2 | 10/2006 | Edmison et al. |
| 7,835,280 | B2 | 11/2010 | Pang et al. |

(Continued)

OTHER PUBLICATIONS

Muyambo, et al., "De-Jitter Control Methods in Ad-Hoc Networks", In International Journal of Engineering Research & Technology, vol. 7, Issue 6, Jun. 2018, pp. 219-228.

(Continued)

*Primary Examiner* — Mohamed A. Wasel
*Assistant Examiner* — Jihad K Boustany
(74) *Attorney, Agent, or Firm* — ArentFox Schiff LLP

(57) ABSTRACT

Receiving, by a network device at a receiving time, one or more packets, each packet being one of a plurality of ordered packets in one of a plurality of streams received at the network device. Determining, by the network device for each received packet, a transmit time based on one timer common to the plurality of streams. Indexing, by the network device in a data store common to the plurality of streams, each packet by the determined transmit time. Transmitting, by the network device at each particular time corresponding to a determined transmit time, all packets in the data store indexed to the particular time.

16 Claims, 6 Drawing Sheets

(56) References Cited

U.S. PATENT DOCUMENTS

| | | | |
|---|---|---|---|
| 10,382,155 B2 | 8/2019 | Tregenza Dancer | |
| 2004/0085963 A1 | 5/2004 | Ying | |
| 2006/0083264 A1* | 4/2006 | Jordan | H04L 12/403 |
| | | | 370/503 |
| 2010/0153577 A1* | 6/2010 | Wohlert | H04L 65/80 |
| | | | 709/231 |
| 2010/0296525 A1 | 11/2010 | Mahkonen | |
| 2012/0324520 A1* | 12/2012 | Van Deventer | H04L 65/765 |
| | | | 725/109 |
| 2014/0169378 A1 | 6/2014 | Shumsky et al. | |
| 2015/0110134 A1* | 4/2015 | Kozica | H04L 65/80 |
| | | | 370/516 |
| 2015/0172197 A1* | 6/2015 | Sun | H04L 47/283 |
| | | | 370/389 |
| 2016/0315860 A1* | 10/2016 | Nichols | H04L 25/03859 |
| 2017/0124664 A1* | 5/2017 | Savenok | H04L 67/1074 |
| 2018/0063008 A1* | 3/2018 | Hammarqvist | H04L 47/283 |
| 2018/0225079 A1* | 8/2018 | Kotteri | G06F 3/165 |
| 2018/0295050 A1* | 10/2018 | Lee | H04L 43/087 |
| 2019/0081902 A1 | 3/2019 | Cartwright et al. | |
| 2021/0377330 A1 | 12/2021 | Trayanov et al. | |

OTHER PUBLICATIONS

"International Search Report and Written Opinion Issued in PCT Application No. PCT/US22/048902", Mailed Date: Jan. 27, 2023, 12 Pages.

* cited by examiner

PACKET BUFFERING WITH A COMMON TIME-INDEXED DATA STORE ACROSS PACKET STREAMS

CROSS REFERENCE TO RELATED APPLICATIONS

This application claims the benefit of U.S. Provisional Application No. 63/295,014, entitled PACKET BUFFERING WITH A COMMON TIME-INDEXED DATA STORE ACROSS PACKET STREAMS, filed Dec. 30, 2021, the entirety of which is hereby incorporate herein by reference.

BACKGROUND

Voice over Internet Protocol (VoIP) describes a set of technologies for the delivery of voice communications and multimedia sessions over IP networks, such as the Internet. While VoIP sessions can proceed similar to traditional telephony from the user viewpoint, but instead of being transmitted over a circuit-switched network, a digital form of the information is packetized and transmission occurs as IP packets over a packet-switched network.

In contrast to a circuit-switched network, VoIP over a packet switched network does not inherently guarantee that information is not dropped (packet loss), delivered too late to be of use (excessive latency), or delivered out of order because of variations in package transit time from the source to the destination. Packets sent from the same source do not always reach the destination at regular intervals, even if they were transmitted in a continuous stream. In VoIP "jitter" is a measurement of this variation in packet delay. Jitter can occur for various reasons, e.g., network congestion, network timing drift, or network route changes.

A "jitter buffer" is a data store where packets can be received, stored, and then sent on (e.g., to an output processor) in (mostly) evenly spaced intervals in spite of transit time variation. The jitter buffer intentionally delays the arriving packets so that the end user experiences a clearer connection with less distortion. Jitter buffers mitigate jitter by buffering a number of packets to absorb the delay differences between them, and then outputting the packets in order at a (mostly) constant rate. This gives the more delayed packets a chance to catch up so that all packets are output relatively smoothly. As with any type of buffering, the larger the jitter buffer is, the longer a packet's playout delay becomes.

There are two kinds of jitter buffers, static and dynamic. A static jitter buffer typically is pre-configured. A dynamic jitter buffer is software-based and can be configured to adapt to changes in the network's delay.

SUMMARY

The following presents a simplified summary of one or more aspects of the technology disclosed herein in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In several examples, computer implemented methods, devices, and tangible non-transitory computer-readable media for packet buffering are provided. In some examples, a network device receives, at a receiving time, one or more packets, each packet being one of a plurality of ordered packets in one of a plurality of streams received at the network device. The network device determines, for each received packet, a transmit time based on one timer common to the plurality of streams. The network device indexes, in a data store common to the plurality of streams, each packet by the determined transmit time. The network device transmits, at each particular time corresponding to a determined transmit time, all packets in the data store indexed to the particular time.

In some such examples N is a depth of the data store, and a maximum delay between a receiving time and a transmit time is N. In some such examples, the data store is: a hash table using transmit time as a hash table key, or a ring timer using transmit time modulo N as a ring timer key.

In some examples, the plurality of streams comprises at least one hundred streams. In some examples, the network device is a session border controller. In some examples, the timer and the data store comprise one timer and data store combination for each of a plurality of processors of the network device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Typically, jitter buffers are used on end user devices, e.g., smart phones. Such end user devices typically handle one or a small number of streams at a time, and employ a separate jitter buffer for each stream. Each jitter buffer determines how much delay to apply to each incoming packet—a topic outside the scope of this application. Each jitter buffer operates its own clock/timer—as distinguished from, though derived from, a device-wide clock—and its own data storage. Maintaining a per-stream jitter buffer with its own clock/timer and data storage, and examining each buffer for packets to transmit at any given time can introduce significant overhead to the VoIP process.

Turning now to FIG. 1-FIG. 6, examples are depicted with reference to one or more components and one or more methods that may perform the actions or operations described herein. Although the operations described below in are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
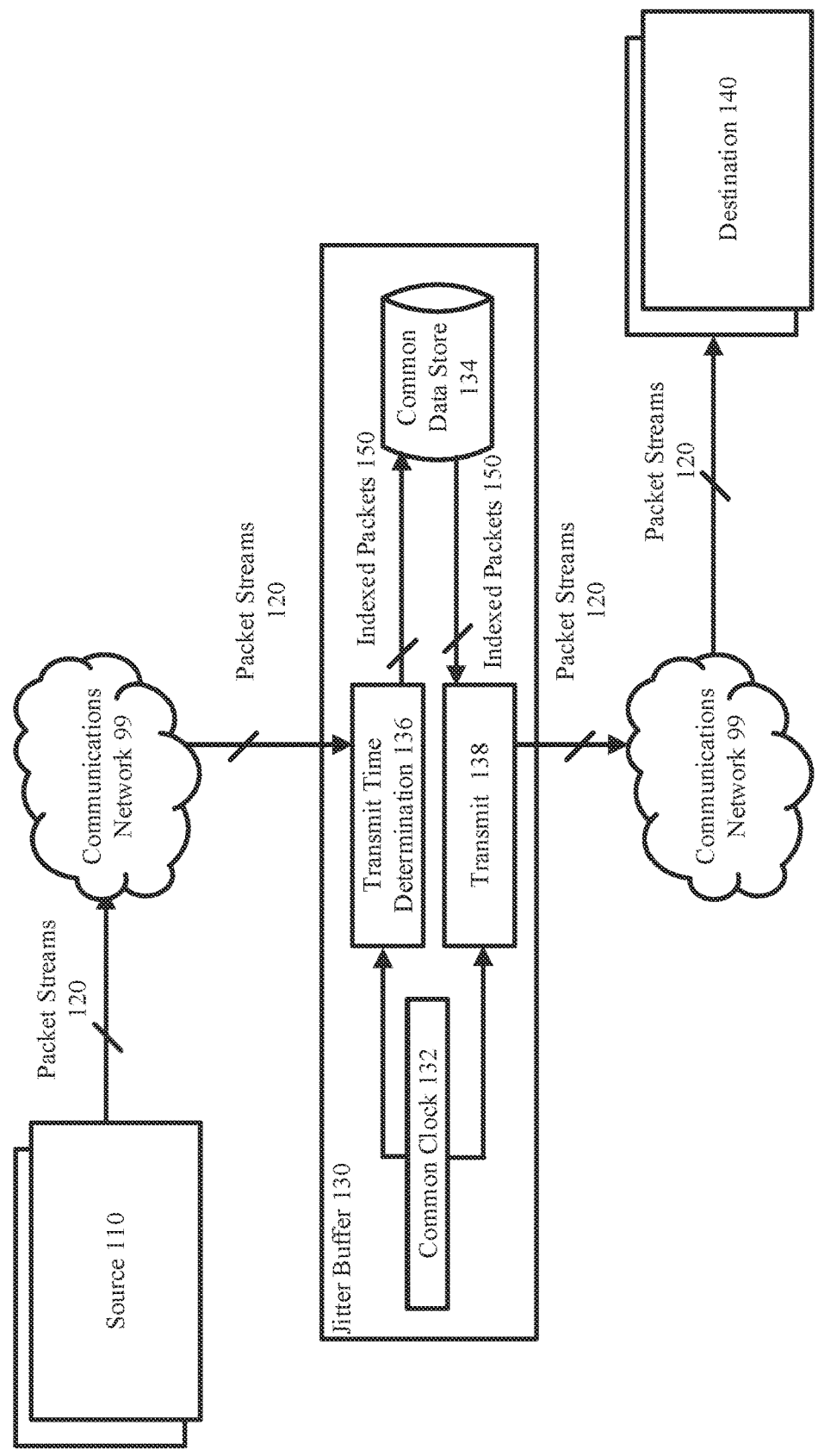
FIG. 1 is an illustration of examples of the present technology in a telecommunications context.

Referring to FIG. 1, an example of the technology disclosed herein in the context of a notional architecture 100 is illustrated. Examples of the technology disclosed herein address the above challenges in part by storing all packets from a plurality of packet streams 120 from one or more sources 110 in single jitter buffer 130 before transmitting the packets to one or more destinations 140. Communications network 99 between source(s) 110, jitter buffer 130, and destination(s) 140 is characterized by variations in transit time between the source(s) 110 and the jitter buffer 130. The jitter buffer 130 includes a common data store 134 of indexed packets 150, with each indexed packet 150 indexed by a determined transmit time. A common clock 132 is used to track the current time, used in the transmit time determination 136, and used to transmit 138 all indexed packets 150 that are indexed to the determined transmit time.

While the determined transmit time is identified by a single point in time, in practice the determined transmit time corresponds to a period from the determined transmit time to the next granular time of the jitter buffer. For example, the period can equal the granularity of the transmit time determination 136, e.g., one millisecond. The granularity of the data store 134 should be sufficiently precise to enable the indexed packets 150 to be appropriately indexed, e.g., at least as precise as the granularity of the transmit time determination 136, and precise enough that any error introduced is tolerable.

Figure 2:
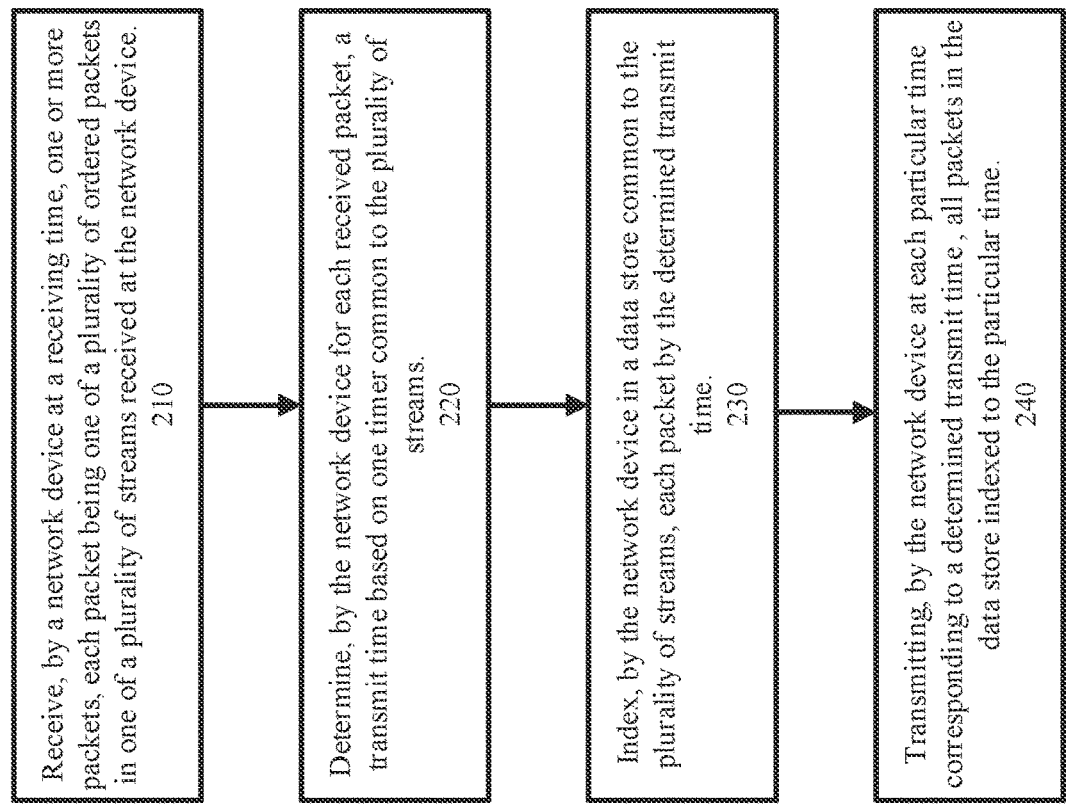
FIG. 2 is a flow chart of example methods of packet buffering, in accordance with examples of the technology disclosed herein.

Referring to FIG. 2, and continuing to refer to prior figures for context, example methods 200 for packet buffering are shown, in accordance with the technology disclosed herein. In such methods, a network device receives, at a receiving time, one or more packets—Block 210. Each packet is one of a plurality of ordered packets in one of a plurality of streams received at the network device.

Figure 3:
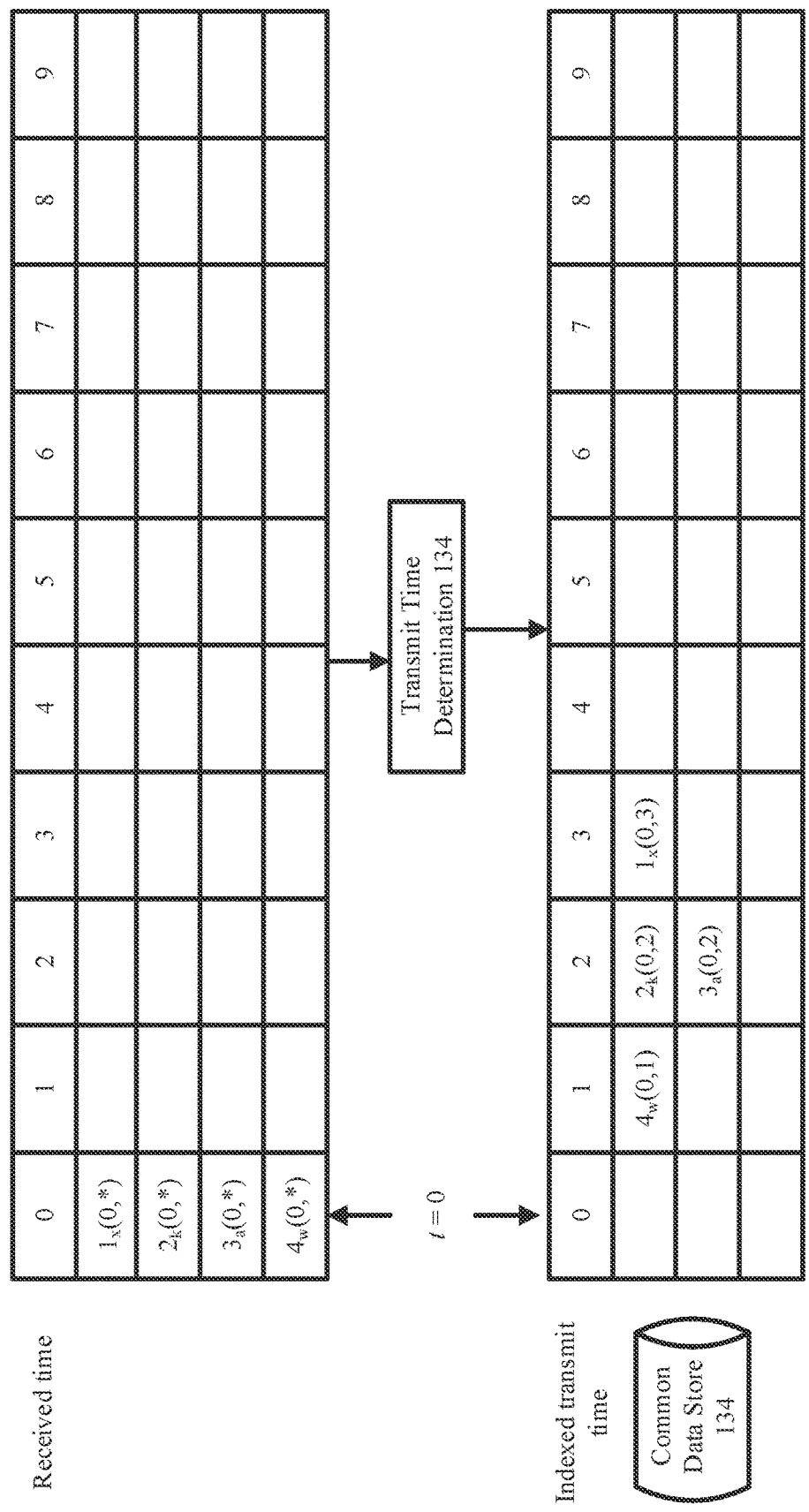
FIG. 3 is a continuing example of packet buffering, in accordance with examples of the technology disclosed herein.

Referring to FIG. 3, and continuing to refer to prior figures for context, a continuing example method 300 is illustrated at time t=0. In the continuing example, the jitter buffer 130 is part of a session border controller (SBC).

An SBC is a network device deployed to protect session initiation protocol (SIP) based voice over VoIP networks. While some SBCs are deployed at borders between two service provider networks, such devices (and related devices) can be deployed between a service provider's access network and a backbone network to provide service to residential and/or enterprise customers. A "session" can be a call between two or more parties. Each call includes one or more signaling message exchanges that control the call, and one or more call media streams that carry the call's audio, video, or other data along with information of call statistics and quality. Together, these packet streams, e.g., a packet stream 120, make up a session. Some SBCs, or SBC-like devices, handle thousands (or even tens of thousands) of calls/packet streams concurrently.

While the continuing example explains the invention in the context of a jitter buffer in an SBC, the technology disclosed herein has use in any situation involving a jitter buffer handling a high volume of calls/packet streams. While the continuing example cites VoIP, note that VoIP can contain packets for not only voice, but also other media and protocols. Jitter buffers are equally applicable to other media streams over IP (e.g. video), and to voice over other protocols (e.g. TDM).

In the continuing example, the time granularity for jitter buffer 130 data store 134 is 1 ms, and the maximum depth of the jitter buffer 130 data store 134 is 10 ms. In some practical implementations, the time granularity is also 1 ms, but the jitter buffer maximum depth can be much larger, e.g., 8000 ms. In the continuing example, there are four (4) streams 120 are received at the jitter buffer 130. Specifically, at t=0 there is one packet received for each stream: $1_x(0,*)$, $2_k(0,*)$, $3_a(0,*)$, and $4_w(0,*)$—where: packet=<stream>(<received time>, <determined transmit time>), e.g., $4_w(0,*)$, where "*" indicates that a transmit time has not yet been determined. In the continuing example, at t=0 no transmit times have been determined.

In some examples, jitter buffer 130 is deployed in a physical or virtual device such as device 600 described below, and jitter buffer component 612 of device 600 provides means for receiving, at a receiving time, one or more packets.

Referring again to FIG. 2, the network device determines, for each received packet, a transmit time based on one timer common to the plurality of streams—Block 220. In the continuing example of FIG. 3, transmit time determination 136 determines to transmit the stream 4 packet at t=1, the stream 2 packet and the stream 3 packet at t=2, and the stream 1 packet at t=0 using clock 132 (which is common across each of the packet streams 120). The specific transmit time determination method is not covered in this application—many known approaches can be used.

In some examples, jitter buffer component 612 of device 600 provides means for determining, for each received packet, a transmit time based on one timer common to the plurality of streams.

Referring again to FIG. 2, the network device indexes, in a data store common to the plurality of streams, each packet by the determined transmit time—Block 230. In the continuing example of FIG. 3, jitter buffer 130 stores indexed packets 150 in common data store 134 using the determined transmit time as the index as: $1_x(0,4)$ at t=3 ms; $2_k(0,2)$ and $3_a(0,2)$ at t=2 ms; and $4_w(0,1)$ at t=1 ms.

Specifically, jitter buffer 130 implements a hash table of packets keyed by transmit time. Other types of indexing can be used, e.g., a ring timer using transmit time modulo N as a ring timer key where N is the depth of the ring timer. In general, N is the depth of the data store and the maximum delay between a receiving time and a transmit time is N. In some examples, both a common timer 132 and the common data store 134 are used for each processor of a plurality of processors in the network device. Further, note that while the time index of the continuing example is looped, e.g., time index "0" follows time index "9," received time is not a looped time in the continuing example.

In some examples, jitter buffer component 612 of device 600 provides means for indexing, in a data store common to the plurality of streams, each packet by the determined transmit time.

Figure 4:
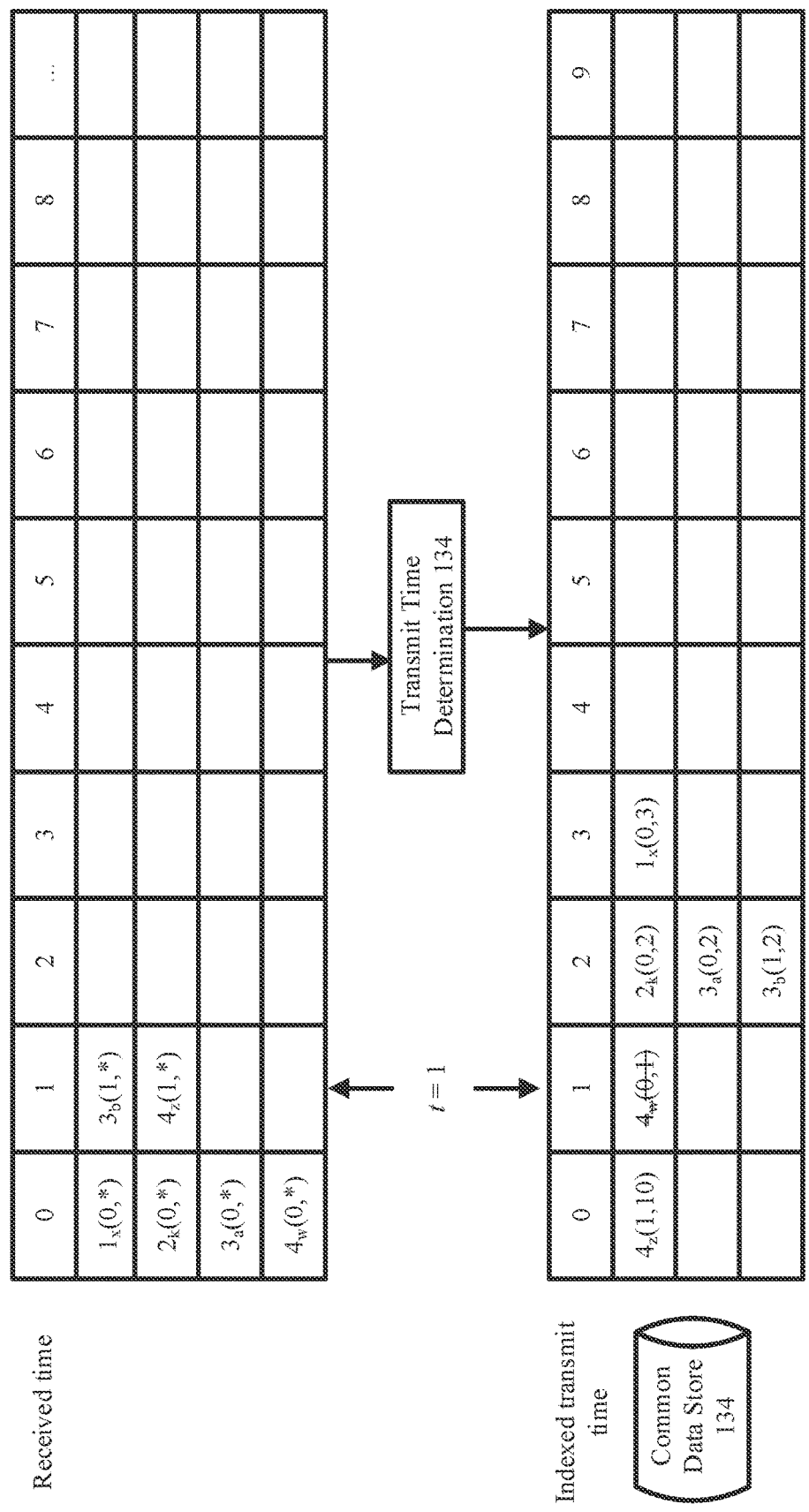
FIG. 4 is a continuing example of packet buffering, in accordance with examples of the technology disclosed herein.

Referring again to FIG. 2, the network device transmits, at each particular time corresponding to a determined transmit time, all packets in the data store indexed to the particular time—Block 240. Referring to FIG. 4, and continuing to refer to prior figures for context the continuing example method 400 is illustrated at time t=1. In the continuing example at t=1 ms, jitter buffer 130 transmits $4_w(0,1)$ (indicated by strikethrough in FIG. 4). In addition, as described with respect to Block 210, the jitter buffer 130 receives packets $3_b(1,*)$ and $4_z(1,*)$. Further, as described with respect to Block 220, jitter buffer 130 determines a transmit time for each of the newly-received packets—indexing $3_b(1,2)$ for transmit at t=2, and indexing $4_z(1,0)$ for transmit at t=10 (corresponding to t=0 in the ten-slot hash table of FIG. 3—FIG. 5). Note that "jitter buffer 130 transmits" includes elements of the SBC outside of the instructions and data store that physically interface with the communications network 99.

In some examples, jitter buffer component 612 of device 600 provides means for transmitting, at each particular time corresponding to a determined transmit time, all packets in the data store indexed to the particular time.

Figure 5:
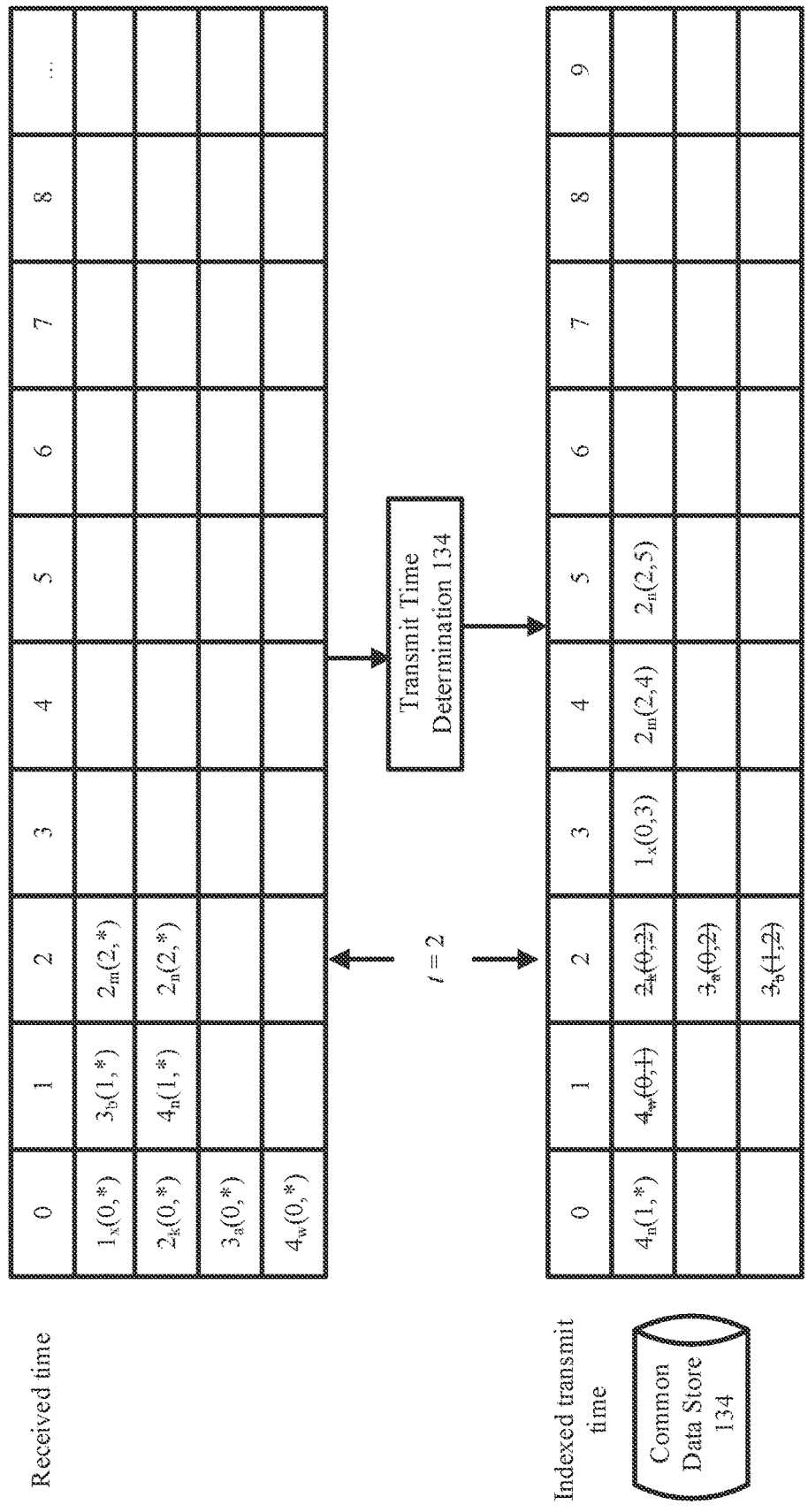
FIG. 5 is a continuing example of packet buffering, in accordance with examples of the technology disclosed herein.

Referring to FIG. 5, and continuing to refer to prior figures for context the continuing example method 500 is illustrated at time t=2. In the continuing example at t=2 ms, jitter buffer 130 transmits $2_k(0,2)$, $3_a(0,2)$, and $3_b(1,2)$ (indicated by strikethrough in FIG. 5). In addition, as described with respect to Block 210, the jitter buffer 130 receives packets $2_m(2,*)$ and $2_n(2,*)$. Further, as described with respect to Block 220, jitter buffer 130 determines a transmit time for each of the newly-received packets—indexing $2_m(2,4)$ for transmit at t=4, and indexing $2_n(2,*)$ for transmit at t=5.

Figure 6:
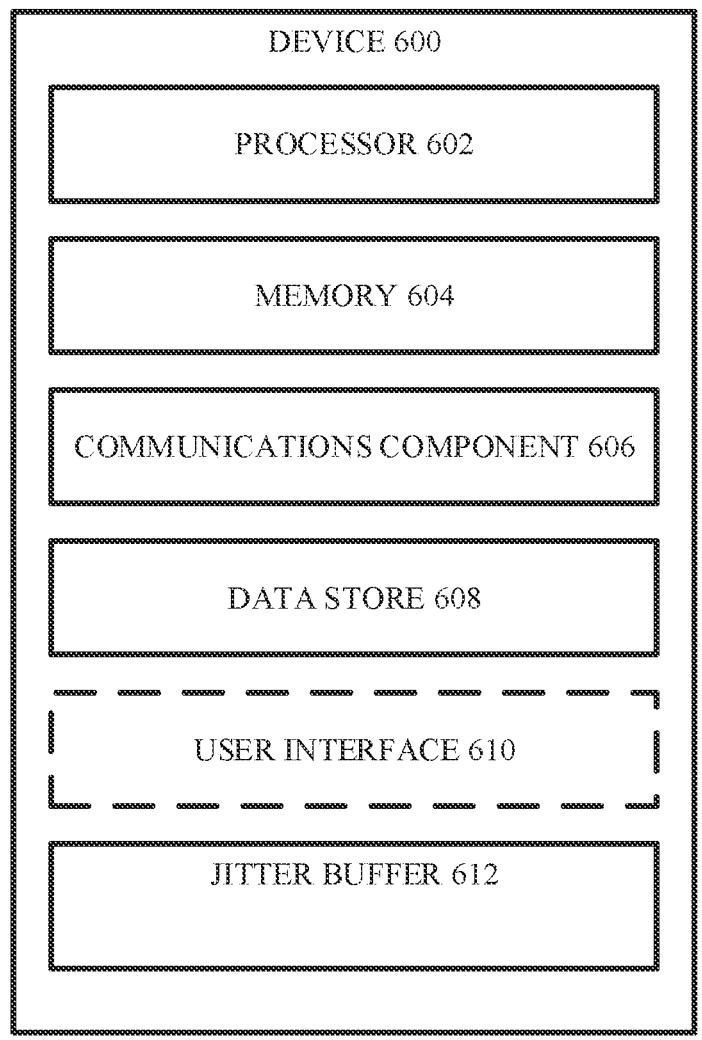
FIG. 6 is a schematic diagram of an example of a device for performing functions described herein.

FIG. 6 illustrates an example of device 600. In one aspect, device 600 may include processor 602, which may be similar to processor 602 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, such as for storing local versions of operating systems (or components thereof) and/or applications being executed by processor 602, such as a streaming application/service, etc., related instructions, parameters, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc.) not currently being executed by processor 602. In addition, data store 608 may be a data repository for streaming application/service 612 and/or one or more other components of the device 600.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof. For example, user interface 610 may render streaming content for consumption by a user (e.g., on a display of the device 600, an audio output of the device 600, and/or the like).

Device 600 may additionally include a jitter buffer component 612, which may be similar to or may include jitter buffer 130. In this regard, device 600 may be operable to perform a role in packet buffering, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

As a first further example, the technology disclosed herein includes methods, devices, and non-transitory computer-readable medium storing instructions thereon for packet buffering. In such examples, a network device receives, at a receiving time, one or more packets, each packet being one of a plurality of ordered packets in one of a plurality of streams received at the network device. The network device determines, for each received packet, a transmit time based on one timer common to the plurality of streams. The network device indexes, in a data store common to the plurality of streams, each packet by the determined transmit time. The network device transmits, at each particular time corresponding to a determined transmit time, all packets in the data store indexed to the particular time.

A second further example includes the first further example, wherein N is a depth of the data store, and a maximum delay between a receiving time and a transmit time is N.

A third further example includes the previous further examples, wherein the data store is: a hash table using transmit time as a hash table key, or a ring timer using transmit time modulo N as a ring timer key.

A fourth further example includes the previous further examples wherein the plurality of streams comprises at least one hundred streams.

A fifth further example includes the previous further examples, wherein the network device is a session border controller.

A sixth further example includes the previous further examples wherein the timer and the data store comprises one timer and data store combination for each of a plurality of processors of the network device.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

We claim:

1. A computer implemented method, comprising:
    receiving, via a packet switched network by a network device and at a receiving time with respect to the network device, one or more network packets, each network packet being one of a plurality of ordered network packets in one of a plurality of streams received across a plurality of sources of the packet switched network at the network device;
    determining, by the network device for each received network packet, a transmit time with respect to the network device based on one timer common to the plurality of streams;
    indexing, by the network device in a data store common to the plurality of streams, each received network packet by the determined transmit time, wherein the data store is a hash table using the transmit time as a hash table key; and
    transmitting, by the network device each indexed network packet from the data store at the determined transmit time corresponding to the indexed network packet.

2. The method of claim 1, wherein the plurality of streams comprises at least one hundred streams.

3. The method of claim 1, wherein the network device is a session border controller.

4. The method of claim 1, wherein each of one or more processors of the network device uses a single timer and data store combination for the determining and the indexing.

5. A network device for packet buffering, comprising:
    a memory; and
    at least one processor coupled to the memory, the memory including instructions executable by the at least one processor to cause the network device to:
        receive, at a receiving time, one or more packets, each packet being one of a plurality of ordered packets in one of a plurality of streams received across a plurality of sources at the network device;
        determine for each received packet, a transmit time based on one timer common to the plurality of streams;
        index, in a data store common to the plurality of streams, each received packet by the determined transmit time, wherein N is a depth of the data store, and the data store is a hash table using the transmit time as a hash table key; and
        transmit, each indexed packet from the data store at the determined transmit time corresponding to the indexed packet.

6. The device of claim 5, wherein the plurality of streams comprises at least one hundred streams.

7. The device of claim 5, wherein the network device is a session border controller.

8. The device of claim 5, wherein each of one or more processors of the network device uses a single timer and data store combination for the determining and the indexing.

9. A non-transitory computer-readable medium storing instructions thereon that, when executed by at least one computing device, causes the at least one computing device to perform operations comprising:
    receiving, by a network device at a receiving time, one or more packets, each packet being one of a plurality of ordered packets in one of a plurality of streams received across a plurality of sources at the network device;
    determining, by the network device for each received packet, a transmit time based on one timer common to the plurality of streams;
    indexing by the network device in a data store common to the plurality of streams, each received packet by the determined transmit time, wherein N is a depth of the data store, and the data store is a hash table using the transmit time as a hash table key; and transmitting, by the network device, each indexed packet from the data store at the determined transmit time corresponding to the indexed packet.

10. The computer-readable medium of claim 9, wherein the plurality of streams comprises at least one hundred streams.

11. The computer-readable medium of claim 9, wherein the network device is a session border controller.

12. The computer-readable medium of claim 9, wherein each of one or more processors of the network device uses a single timer and data store combination for the determining and the indexing.

13. A network device for packet buffering, comprising:
   means for receiving, by a network device at a receiving time, one or more packets, each packet being one of a plurality of ordered packets in one of a plurality of streams received across a plurality of sources at the network device;
   means for determining, by the network device for each received packet, a transmit time based on one timer common to the plurality of streams;
   means for indexing, by the network device in a data store common to the plurality of streams, each received packet by the determined transmit time, wherein N is a depth of the data store, and the data store is a hash table using the transmit time as a hash table key; and
   means for transmitting, by the network device, each indexed packet from the data store at the determined transmit time corresponding to the indexed packet.

14. The device of claim 13, wherein the plurality of streams comprises at least one hundred streams.

15. The device of claim 13, wherein the network device is a session border controller.

16. The device of claim 13, wherein each of one or more processors of the network device uses a single timer and data store combination for the determining and the indexing.

* * * * *